United States Patent
Aotsuka

(10) Patent No.: US 11,474,737 B2
(45) Date of Patent: Oct. 18, 2022

(54) VEHICLE DATA RECORDING DEVICE

(71) Applicant: DENSO CORPORATION, Kariya (JP)

(72) Inventor: Yuuichi Aotsuka, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/202,645

(22) Filed: Mar. 16, 2021

(65) Prior Publication Data

US 2021/0294520 A1    Sep. 23, 2021

(30) Foreign Application Priority Data

Mar. 17, 2020  (JP) .............................. JP2020-046842

(51) Int. Cl.
*G06F 3/06*     (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0679; G06F 3/0604
See application file for complete search history.

(56) References Cited

U.S. PATENT DOCUMENTS

| | | | |
|---|---|---|---|
| 9,418,699 B1* | 8/2016 | Gibbons | G11B 20/1217 |
| 2014/0257594 A1* | 9/2014 | Hashimoto | G07C 5/10 |
| | | | 701/1 |
| 2018/0215042 A1* | 8/2018 | Nakayama | B25J 9/1694 |
| 2020/0327065 A1* | 10/2020 | Jung | G06F 9/485 |

* cited by examiner

*Primary Examiner* — Mark A Giardino, Jr.
(74) *Attorney, Agent, or Firm* — Posz Law Group, PLC

(57) ABSTRACT

A vehicle data recording device includes a non-volatile memory, a counting unit, a writing unit, a counter determination unit, a switching unit, an event determination unit, and a recording unit. A storage area of the non-volatile memory is divided into blocks. The counting unit is configured to count a number of writes to each of the blocks. The writing unit is configured to write the data to a target block. The counter determination unit is configured to determine whether the number of writes reached a predetermined number. When the counter determination unit determines that the number of writes reached the predetermined number, the switching unit excludes the target block from the writing target, sets the target block as a non-target block. The recording unit is configured to record recording data by writing the recording data to the non-target block when the event occurred.

7 Claims, 14 Drawing Sheets

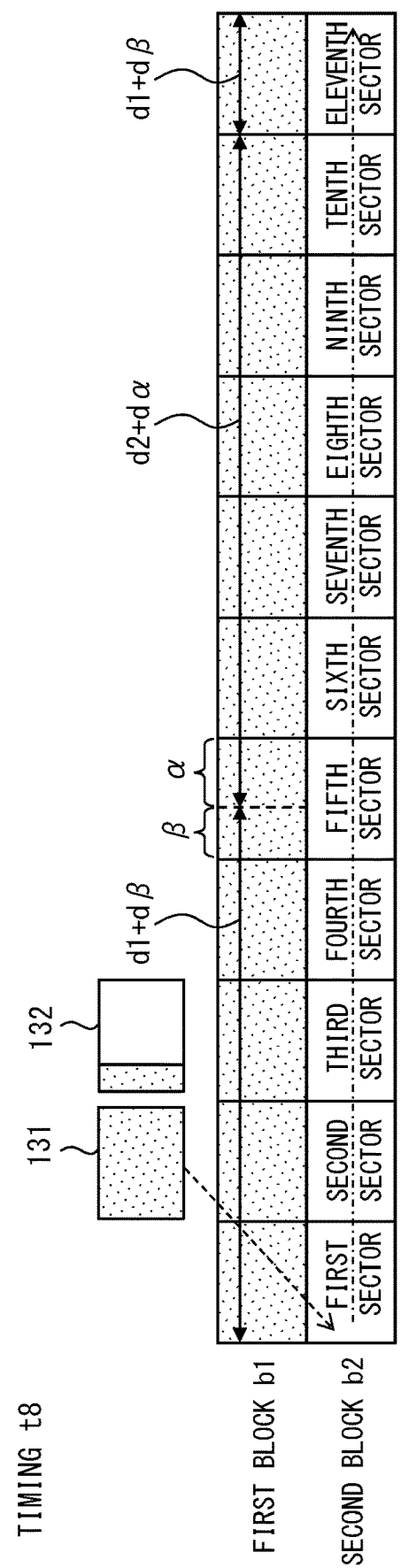

VEHICLE DATA RECORDING DEVICE

CROSS REFERENCE TO RELATED APPLICATION

This application is based on and incorporates herein by reference Japanese Patent Application No. 2020-046842 filed on Mar. 17, 2020.

TECHNICAL FIELD

The present disclosure relates to a vehicle data recording device.

BACKGROUND

A known vehicle data recording device is configured to record data indicative of the state of the vehicle at the time when an event occurs, and data indicative of the state of the vehicle for a predetermined time after the event occurs.

SUMMARY

A vehicle data recording device of a first aspect includes a non-volatile memory configured to store data indicative of a vehicle state, a storage area of the non-volatile memory being divided into blocks each of which has a size corresponding to the data for a predetermined time period before and after an event occurs; a counting unit configured to count a number of writes to each of the blocks; a writing unit configured to write the data to a target block that is a writing target in the blocks; a counter determination unit configured to determine whether the number of writes to the target block reached a predetermined number that is smaller than a writing upper limit; a switching unit, wherein when the counter determination unit determines that the number of writes to the target block reached the predetermined number, the switching unit excludes the target block from the writing target of the writing unit, sets the target block as a non-target block, and switches the target block to another one of the blocks; an event determination unit configured to determine whether the event occurred; and a recording unit configured to record recording data that is the data for the predetermined time period before and after the event occurred by writing the recording data to the non-target block when the event determination unit determines that the event occurred.

A vehicle data recording device of a second aspect includes a non-volatile memory configured to store data indicative of a vehicle state, a storage area of the non-volatile memory being divided into blocks each of which has a size corresponding to the data for a predetermined time period before and after an event occurs; and a processor. The processor is configured to: count a number of writes to each of the blocks; write the data to a target block that is a writing target in the blocks; determine whether the number of writes to the target block reached a predetermined number that is smaller than a writing upper limit; exclude the target block from the writing target, set the target block as a non-target block, and switch the target block to another one of the blocks when the counter determination unit determines that the number of writes to the target block reached the predetermined number; determine whether the event occurred; and record recording data that is the data for the predetermined time period before and after the event occurred by writing the recording data to the non-target block when the event determination unit determines that the event occurred.

BRIEF DESCRIPTION OF THE DRAWINGS

FIG. 14 is a diagram illustrating a recording process for a pre-event data according to the embodiment.

DETAILED DESCRIPTION

A vehicle data recording device may be required to record data for a predetermined time period from the time when an event including an accident, a small impact, a traffic violation occurs. It may be useful that the vehicle data recording device records the data for longer time when an event occurs.

However, elongating the recording time may lead to an increase of the amount of data to be recorded, and accordingly the data may be Therefore, it may be conceivable that the vehicle data recording device writes the data to the non-volatile memory.

However, the non-volatile memory has a limit of the number of write cycles. Accordingly, when the data is written in the non-volatile memory, the non-volatile memory may be likely to reach its limit of the number of write cycles, and the life of the non-volatile memory may be shortened.

An embodiment for carrying out the present disclosure is hereinafter described with reference to the drawings.

A vehicle data recording device will be described below with reference to FIGS. 1-14. In the present embodiment, the vehicle data recording device is applied to a data recording ECU 10. The data recording ECU 10 is configured to be mounted on a vehicle.

Figure 1:
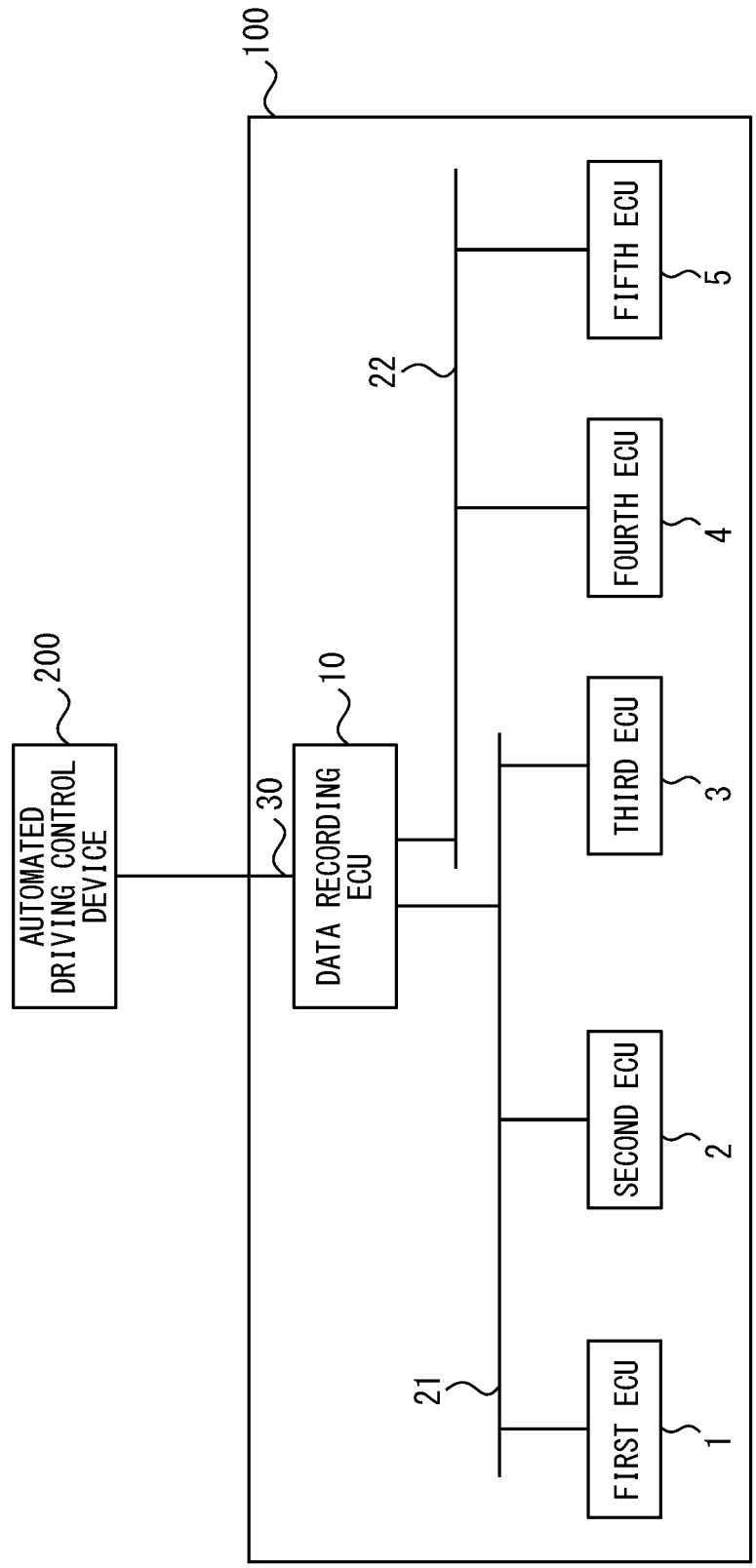
FIG. 1 is a block diagram illustrating an in-vehicle system according to an embodiment.

The configurations of the data recording ECU 10 will be described with reference to FIGS. 1-5. An automated driving system including the data recording ECU 10 as shown in FIG. 1 will be described. The automated driving system includes a vehicle control system 100 and an automated driving control device 200. That is, the vehicle has an automated driving function.

The automated driving control device 200 includes a computer having a CPU, a ROM, a RAM, a communication device, and the like. The automated driving control device 200 may be mounted on the vehicle together with the vehicle control system 100, or be provided outside the vehicle. The automated driving control device 200 is configured to transmit data indicative of a traveling instruction to the vehicle control system 100 and to receive data indicative of traveling information from the vehicle control system 100. The traveling instruction may include a running instruction, a turning instruction, and a stopping instruction. The traveling information may include a distance traveled, and information indicating that the vehicle is turning. The traveling information may include a state of a driver. The traveling information may be information necessary for automated driving control. The data indicative of the traveling instruction and the data indicative of traveling information correspond to a data indicative of a vehicle state.

The vehicle control system 100 includes a data recording ECU 10, ECUs 1-5, and buses 21, 22. The data recording ECU 10 is connected with the automated driving control device 200 through a communication line 30.

The data recording ECU 10 is connected with a first bus 21 and a second bus 22. A first ECU 1, a second ECU 2, a third ECU 3 are connected with the first bus 21. A fourth ECU 4 and a fifth ECU 5 are connected with the second bus 22.

The ECUs 1-5 are electronic control units for controlling the vehicle. The first ECU 1 is an electronic control unit for controlling acceleration and deceleration. The second ECU 2 is an electronic control unit for controlling steering angle. The third ECU 3 is an electronic control unit for controlling a meter. The fourth ECU 4 is an electronic control unit for controlling ABS (Anti-lock Breaking System). The fifth ECU 5 is an electronic control unit for controlling PCS (Pre-Collision System). However, this is just one example. The present disclosure is not limited thereto.

The data recording ECU 10 is configured to communicate with the automated driving control device 200 through the communication line 30. The data recording ECU 10 may perform wireless communication to communicate with the automated driving control device 200. That is, the data recording ECU 10 is configured to perform wired communication or wireless communication with the automated driving control device 200.

The data recording ECU 10 is configured to communicate with the first ECU 1, the second ECU 2, and the third ECU 3 through the first bus 21. The data recording ECU 10 is configured to communication with the fourth ECU 4, and the fifth ECU 5 through the second bus 22.

The data recording ECU 10 is configured to transmit the data received from the automated driving control device 200 to ECUs 1-5. When the data recording ECU 10 received the data indicative of the traveling instruction, the data recording ECU 10 selectively transmits the data indicative of the traveling instruction to corresponding buses 21, 22. The data recording ECU 10 is configured to transmit the data received from the ECUs 1-5 to the automated driving control device 200.

The data recording ECU 10 is configured to store the data received from the automated driving control device 200 and the data received from the ECUs 1-5. This data is acquired by the data recording ECU 10 by communication. Accordingly, this data may be called the communication data. That is, the data indicative of the vehicle state may be called the communication data.

The communication data will be described with reference to FIG. 3. The communication data contains information necessary to assess the situation at the time of the event. The communication data contains information for assessing that which one was in charge when the event occurred, and information for assessing that what was done in response to the event. The data recording ECU 10 is configured to record the communication data.

For example, when the event occurs during the automated driving, it may need to be clarified that which of the driver, the automated driving control device 200, or the vehicle is responsible for the occurrence of the event. In view of this point, the data recording ECU 10 is configured to record the communication data. The events are not limited to accidents, but also include small impacts, traffic violations, and the like. Since the event is not limited to accidents, it may be assumed that the vehicle will continue to run even after the event occurs. For this reason, it may be desirable that the data recording ECU 10 is configured to record the data size for multiple events.

For example, airbag ECUs record vehicle information, such as acceleration, for several seconds before and after the event. However, it may be useful that the data recording ECU 10 records the data for longer time when an event occurs. Especially, when the data recording ECU 10 is mounted on the vehicle having an automated driving function, the communication data for longer time may be useful for clarifying that which one is responsible for the occurrence of the event.

In view of this point, the data recording ECU 10 is configured to record the communication data for predetermined time period, for example, tens of seconds before and after the event. As shown in FIG. 3, the data recording ECU 10 is configured to record a pre-event data d1 that is the communication data for the predetermined time period before the event timing ti (pre-event period). Further, the data recording ECU 10 is configured to record a post-event data d2 that is the communication data for the predetermined time period after the event timing ti (post-event period). The pre-event period and the post-event period may be a period of time for which the communication data is required to be recorded in response to the event.

The pre-event data d1 and the post-event data d2 have data size corresponding to one block of the non-volatile memory 13. In the present embodiment, each of the pre-event period and the post-event period corresponds to five sectors. For example, the communication data for h seconds can be stored in one sector. In this case, each of the pre-event period and the post-event period is 5×h seconds. However, the present disclosure is not limited to this. The length of the pre-event period may be different from the length of the post-event period.

Figure 3:
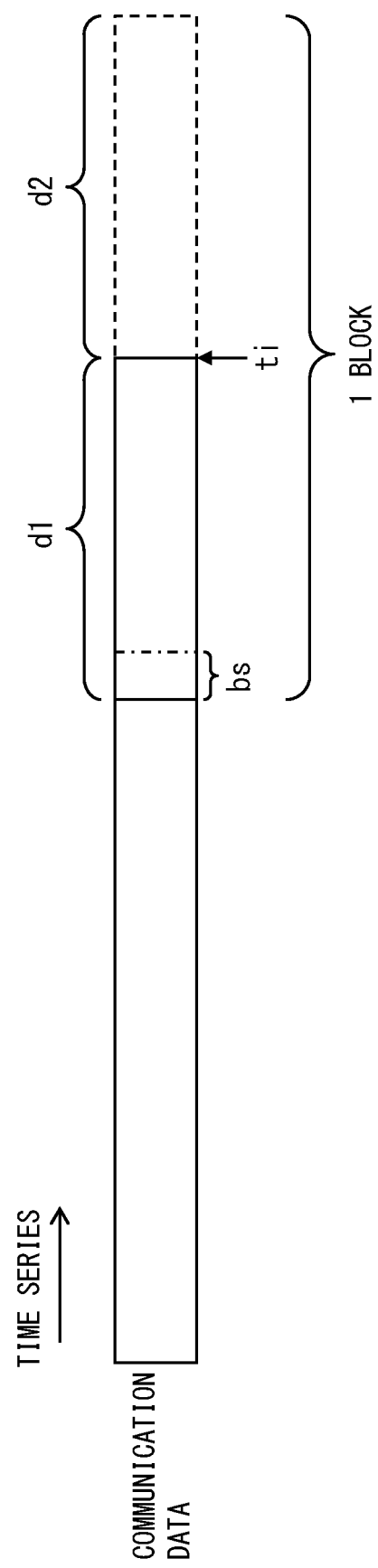
FIG. 3 is a diagram illustrating a communication data according to the embodiment.

The reference letter bs in FIG. 3 represents a buffer size bs of a buffer area 131, 132 of the volatile memory 13. The data sizes of the pre-event data d1 and the post-event data d2 are larger than the buffer size bs. The pre-event data d1 and the post-event data d2 are the communication data for tens of seconds, for example. The communication data for several minutes may be recorded.

However, the data corresponding to the pre-event data d1 and the post-event data d2 cannot be fully stored in the volatile memory 13 of the data recording ECU 10. That is, the capacity of the volatile memory 13 is smaller than the non-volatile memory 14, and the volatile memory 13 is also used for the data communication and other processing. Accordingly, the volatile memory 13 does not have enough capacity to store the required data size. The data recording ECU 10 is configured to store the communication data corresponding to the pre-event data d1 and the post-event data d2 in the non-volatile memory 14 even when the event has not occurred.

In the present embodiment, five ECUs 1-5 and two buses 21, 22 are provided. However, the present disclosure is not limited to this. Other configuration may be acceptable as long as at least one ECU is connected with the first bus 21 and the second bus 22. Other configuration may be acceptable as long as the vehicle control system 100 includes at least one bus.

Figure 2:
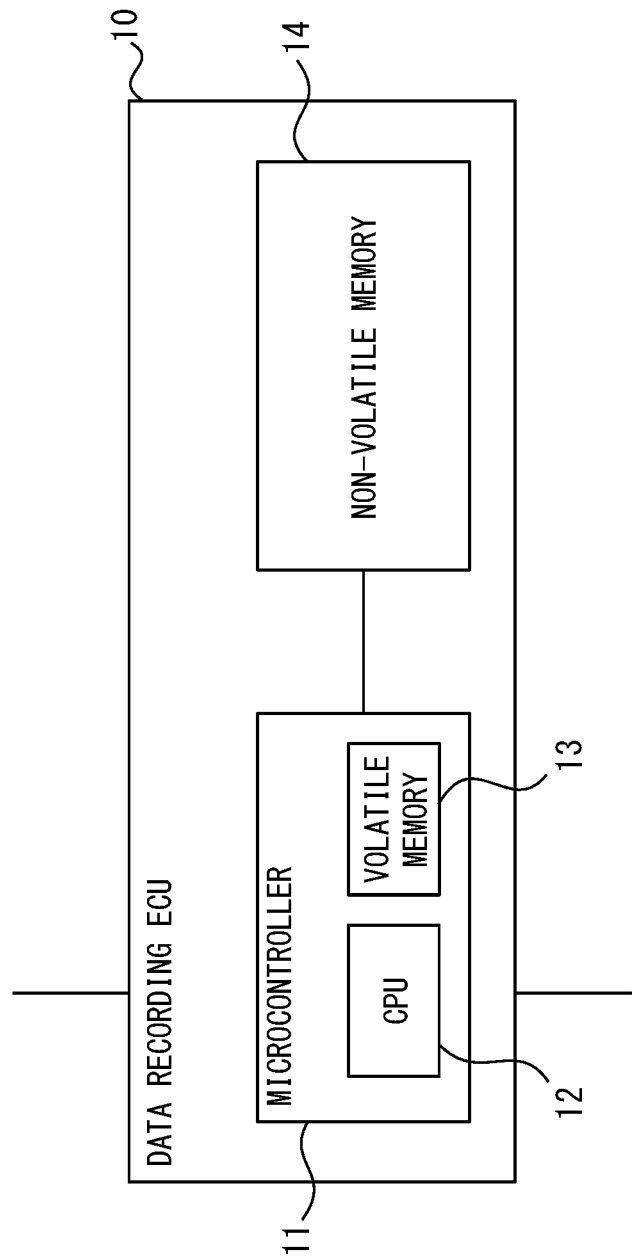
FIG. 2 is a block diagram illustrating a data recording ECU according to the embodiment.

The configurations of the data recording ECU 10 will be described with reference to FIG. 2. The data recording ECU 10 includes the microcontroller 11 and the non-volatile memory 14 connected with the microcontroller 11 through the communication line. In addition to these, the data recording ECU 10 includes communication units for communicating with the automated driving control device 200 and the ECUs 1-5. The communication method of the data recording ECU 10 is not limited to a specific method.

The microcontroller 11 includes a CPU 12 and the volatile memory 13. The CPU 12 is a processing unit and configured to execute arithmetic processing. The CPU 12 of the microcontroller 11 is configured to execute a program stored in the non-volatile memory 14. The CPU 12 is configured to, by executing programs, perform arithmetic processing using the data stored in the storage device while using the volatile memory as a temporary storage unit. The microcontroller 11 of the data recording ECU 10 is configured to control the communication with the automated driving control device 200 and the ECUs 1-5. In the present embodiment, the volatile memory 13 and the non-volatile memory 14 may be collectively referred to as the storage device when the volatile memory 13 and the non-volatile memory 14 are not necessary to be distinguished.

Figure 4:
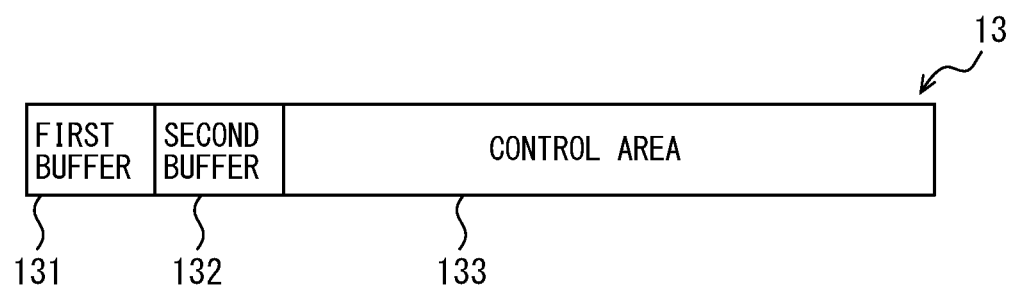
FIG. 4 is a diagram illustrating a volatile memory according to the embodiment.

A semiconductor memory such as RAM (DRAM, SRAM) can be used as the volatile memory 13. As shown in FIG. 4, the storage area of the volatile memory 13 is divided into a first buffer area 131, a second buffer area 132, and a control area 133. The control area 133 is used as a temporary storage unit when the CPU 12 executes programs.

The first buffer area 131 and the second buffer area 132 are used for temporarily storing the acquired communication data and the like. The communication data is sequentially stored in the first buffer area 131 and the second buffer area 132. That is, the communication data is buffered in the first buffer area 131 and the second buffer area 132.

In the present embodiment, the volatile memory 13 has two buffer areas including the first buffer area 131 and the second buffer area 132. While the communication data in one of the first buffer area 131 and the second buffer area 132 is written to the non-volatile memory 14, the acquired communication data is written to the other one of the buffer areas.

The communication data is stored in the first buffer area 131 and the second buffer area 132 of the volatile memory 13 in turn. For example, when the communication data is stored in the first buffer area 131 to be full, the subsequent communication data is stored in the second buffer area 132. The acquired communication data can be stored in the second buffer area 132 while the communication data in the first buffer area 131 is written to the non-volatile memory 14.

However, the present disclosure is not limited to this. In the present disclosure, a volatile memory having only one buffer area can be adopted. Further, a volatile memory having three or more buffer areas can be adopted.

The non-volatile memory 14 is provided outside the microcontroller 11. A semiconductor memory such as EEPROM and Flash Memory can be used as the non-volatile memory 14. The non-volatile memory 14 has larger capacity than that of the volatile memory 13. The non-volatile memory 14 stores the programs executed by the CPU 12 and the communication data. The non-volatile memory 14 may be built in the microcontroller 11.

Figure 5:
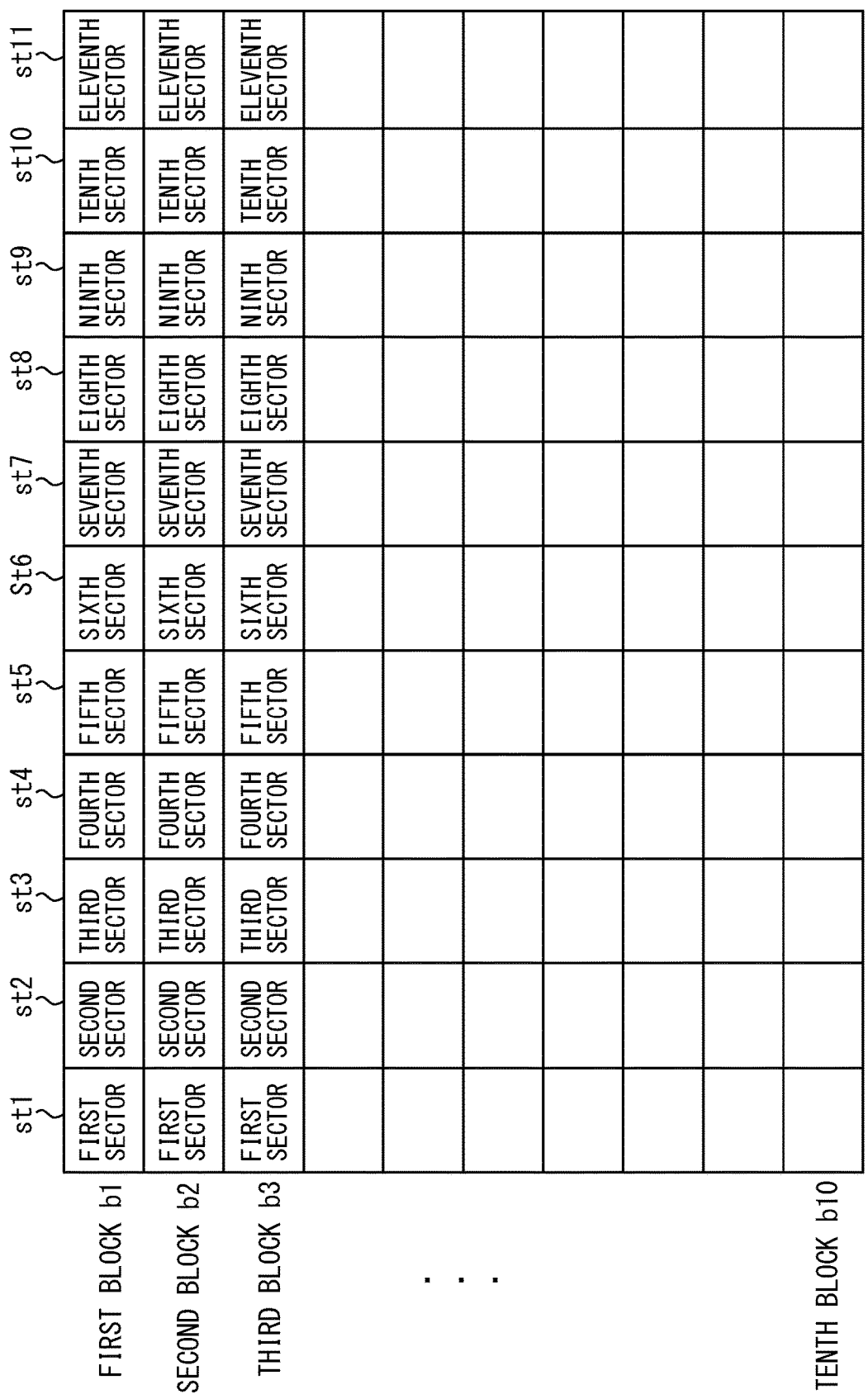
FIG. 5 is a diagram illustrating a non-volatile memory according to the embodiment.

As shown in FIG. 5, the non-volatile memory 14 is divided into blocks b1-b10 such that one block corresponds to the size of the data for the predetermined period before and after the event occurred. Each block has a size that can store the pre-event data d1 and the post-event data d2. That is, one block is an area having a size corresponding to the data which is required to be recorded when the event occurs, i.e. the data which is required to be saved when the event occurs.

In the present embodiment, the non-volatile memory 14 is divided into first to tenth block. However, the present disclosure is not limited to this, and other non-volatile memories can be used as long as the non-volatile memory 14 is divide into multiple blocks.

As shown in FIG. 5, each block b1-b10 is divided into sectors st1-st11 each of which has the size corresponding to the first buffer area 131 and the second buffer area 132. That is, each block b1-b10 is divided into the sectors st1-st11 each of which has the size which can be buffered in the volatile memory 13. Each sector st1-st11 can store the same amount of communication data as the first buffer area 131 and the second buffer area 132.

In the present embodiment, the non-volatile memory 14 is divided into eleven sectors including the first sector st1 to the eleventh sector st11. However, the present disclosure is not limited to this. The number of the sectors can be changed according to the size of the buffer area and the size of one block.

The number of write cycles to the non-volatile memory 14 is limited. Accordingly, it may be conceivable to write the communication data to the non-volatile memory 14 only when the event occurs. However, in the present embodiment, the communication data is written to the non-volatile memory 14 if the data recording ECU 10 is in communication, regardless of whether the event has occurred or not.

The CPU 12 is configured to read the communication data from the volatile memory 13 and write it to the non-volatile memory 14. However, the present disclosure is not limited to this. In the present disclosure, DMA (Direct Memory Access) controller may be provided to write the communication data from the volatile memory 13 to the non-volatile memory 14 without going through the CPU 12.

The processing operations of the data recording ECU 10 will be described with reference to FIGS. 6-14. Timings t1-t8 in FIGS. 11-14 show a series of states of the volatile memory 13 and the non-volatile memory 14.

Figure 6:
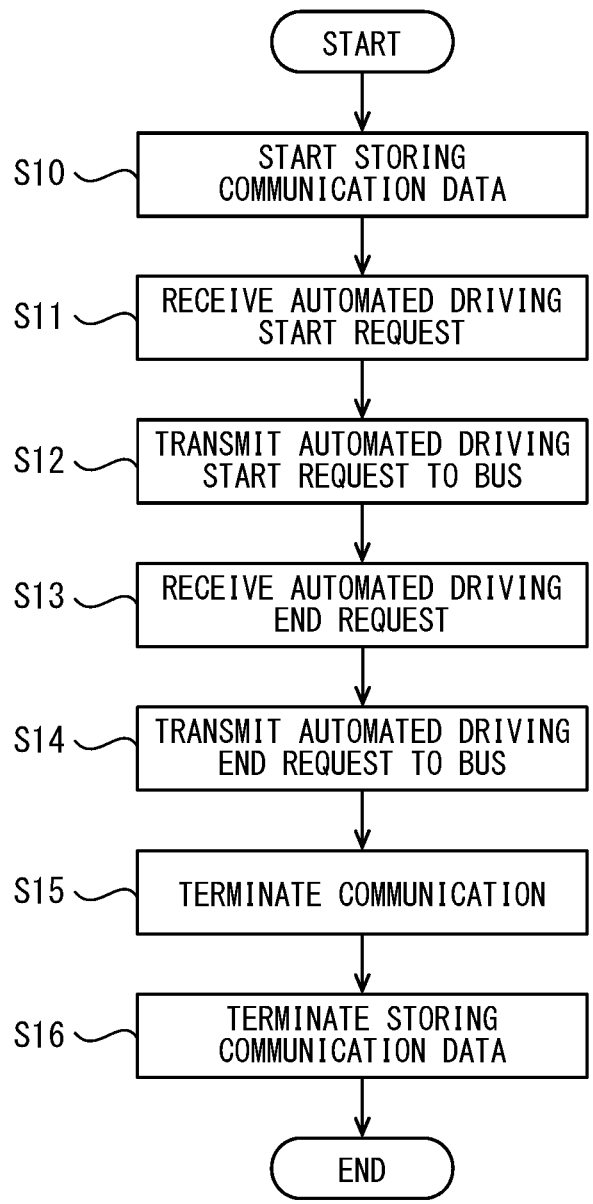
FIG. 6 is a flowchart illustrating a processing operation of the data recording ECU of the embodiment.

After the data recording ECU 10 starts communication, the process shown in the flowchart of FIG. 6 is started. The communication here means the communication between the data recording ECU 10 and the automated driving control device 200 and the ECUs 1-5. The communication is started regardless of the state of the vehicle power. For this reason, the process shown in the flowchart in FIG. 6 may be started regardless of whether the vehicle is started or not.

In step S10, storage of the communication data is started. The microcontroller 11 starts communicating with the automated driving control device 200 and the ECUs 1-5. The storage process of the communication data will be described later.

In step S11, a start request of automated driving is received. When the driver gives an instruction for automated driving, the automated driving control device 200 transmits the start request of the automated driving to the microcontroller 11. Then, the microcontroller 11 receives the start request of the automated driving from the automated driving control device 200.

In step S12, the start request of automated driving is transmitted to the bus. The microcontroller 11 transmits the start request of automated driving to the ECUs 1-5 through the buses 21, 22. As a result, the automated driving is started. When the vehicle arrives at the destination, the automated driving ends. At this time, the automated driving control device 200 transmits an end request of the automated driving to the microcontroller 11.

In step S13, the end request of automated driving is received. The microcontroller 11 receives the end request of automated driving from the automated driving control device 200.

In step S14, the end request of automated driving is transmitted to the bus. The microcontroller 11 transmits the end request of automated driving to the ECUs 1-5 through the buses 21, 22.

In step S15, the communication is terminated. The microcontroller 11 terminates the communication with the automated driving control device 200 and the ECUs 1-5.

In step S16, storage of the communication data is terminated. Since the communication with the automated driving control device 200 and the ECUs 1-5 is terminated, the microcontroller 11 terminates storing the communication data.

The storing process of the communication data will be described with reference to FIG. 7. When the data recording ECU 10 starts storing the communication data in step S10, the data recording ECU 10 starts the process shown in the flowchart of FIG. 7.

In step S20, it is determined whether the event occurred (event determination unit). The microcontroller 11 determines the occurrence of the event by detecting a trigger of the occurrence of the event by the CPU 12. When the microcontroller 11 determines that the event occurred, the process proceeds to step S31. When the microcontroller 11 determines that the event has not occurred, the process proceeds to step S21. That is, when the determination in step S20 is "YES", the microcontroller 11 performs an event writing process, i.e. a writing process in the saving process. In contrast, when the determination in step S20 is "NO", the microcontroller 11 performs a non-event writing process, i.e. a writing process in a normal time.

In step S21, the communication data is stored in the buffer. The microcontroller 11 stores the received communication data to the first buffer area 131 or the second buffer area 132 of the volatile memory 13. For example, at the timing t1 shown in FIG. 9, the communication data is accumulated in the first buffer area 131 first. In FIGS. 9-14, the sectors and the buffers in which the communication data was written are indicated by hatching.

In step S22, it is determined whether the microcontroller 11 is in communication. The microcontroller 11 determines whether the microcontroller 11 is communicating with the automated driving control device 200 and the ECUs 1-5. For example, the CPU 12 of the microcontroller 11 checks the contents of the communication data, and it is determined not to be in communication when the information indicative of the end of the communication is received, and it is determined to be in communication when the information indicative of the end of the communication is not received.

When the microcontroller 11 determines to be in communication, the microcontroller 11 determines that the communication data to be stored will be acquired, and the process proceeds to step S23. In contrast, when the microcontroller 11 determines not to be in communication, the microcontroller 11 determines that the communication to be stored will not be acquired, and the process shown in FIG. 7 ends.

In step S23, it is determined whether the buffer is full. The microcontroller 11 determines whether the communication data has been written in the buffer area that is the current writing target up to its storage limit. For example, in the microcontroller 11, the CPU 12 determines whether the communication data has been written in the first buffer area 131 up to the storage limit of the first buffer area 131. When the microcontroller 11 determines that the communication data has been written up to the storage limit, the process proceeds to step S24. When the microcontroller 11 determines that the communication data has not been written up to the storage limit, the process returns to step S20. That is, steps S20-S23 are repeated while the buffer that is the current writing target is not filled with the communication data.

Figure 9:
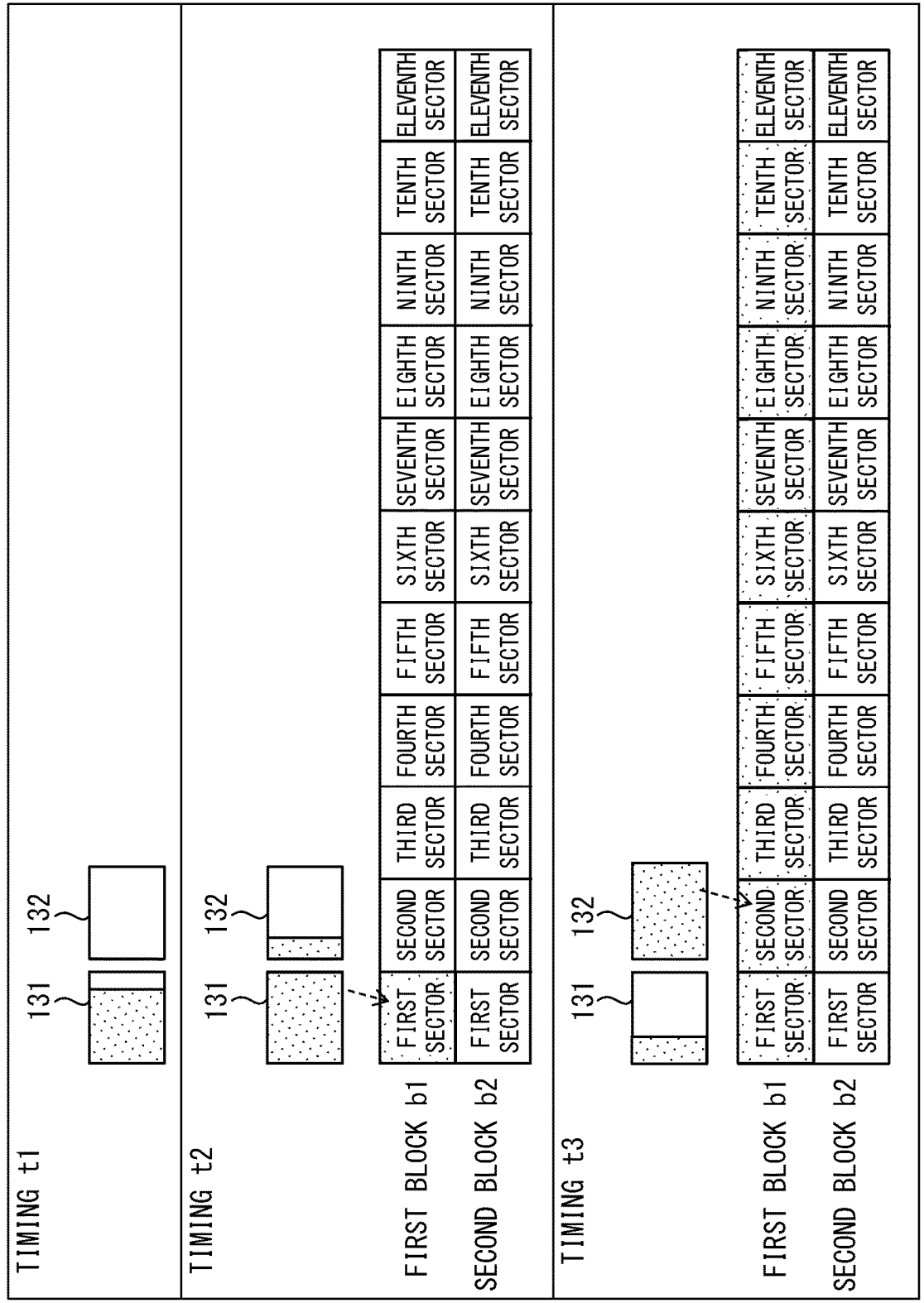
FIG. 9 is a diagram illustrating a writing process before reaching a writing upper limit according to the embodiment.
Figure 10:
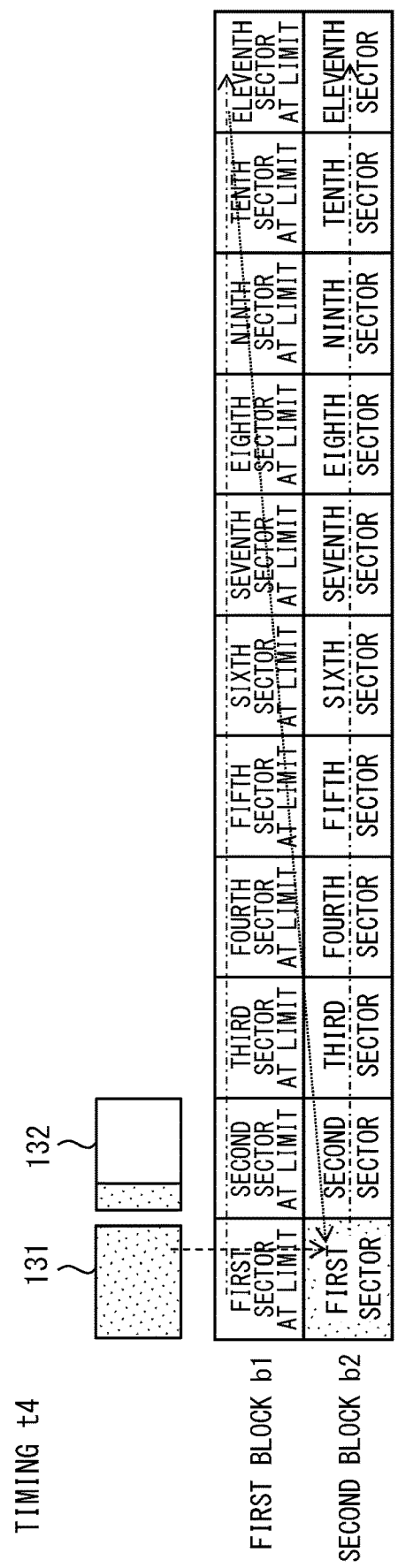
FIG. 10 is a diagram illustrating a writing process after reaching the writing upper limit according to the embodiment.

For example, at the timing t2 shown in FIG. 9, the CPU 12 determines that the communication data has been written in the first buffer area 131 up to the storage limit of the first buffer area 131. In contrast, the CPU does not determine that the communication data has been written in the second buffer area 132 up to the storage limit of the second buffer area 132.

In step S24, it is determined whether the written data exists. The microcontroller 11 determines whether the communication data has been already written in the writing target sector. That is, the microcontroller 11 determines whether the communication data has been written in the target sector that is the writing target sector in a target block that is the writing target block. When the microcontroller 11 determines that the communication data has been already written, the process proceeds to step S30. When the microcontroller 11 does not determine that the communication data has been written, the process proceeds to step S25. The target block is not a limit-block described later, but a block still having a sufficient remaining number of writes.

For example, at the timing t2 shown in FIG. 9, when the first block b1 is the target block and the second sector st2 is the target sector, the microcontroller 11 does not determine that the communication data has been already written in the target sector. In contrast, at the timing t3 shown in FIG. 9, when the first block b1 is the target block and the second sector st2 is the target sector, the microcontroller 11 determines that the communication data has been already written in the target sector.

In step S30, current sector of the non-volatile memory is erased. The current sector is current writing target sector. The microcontroller 11 erases the communication data written in the current sector of the non-volatile memory 14. At the timing t3 shown in FIG. 9, when the first block b1 is the target block and the second sector st2 is the target sector, the microcontroller 11 erases the communication data written in the second sector st2. The microcontroller 11 is configured to repeatedly write the communication data in the predetermined block before the number of writes reaches the writing upper limit. The writing upper limit may be referred to as an upper limit.

In step S25, the communication data is written in the current sector of the non-volatile memory (writing unit). The microcontroller 11 writes the communication data in the buffer area to the current sector of the non-volatile memory 14. The communication data is not written in the current sector of the non-volatile memory 14 at the start of step S25.

The microcontroller 11 writes the communication data to the target block that is the writing target block. Specifically, the microcontroller 11 writes the communication data to the current sector of the target block. That is, the microcontroller 11 writes the communication data, to the target block, stored in the buffer areas 131, 132 each of which corresponds to one sector. The communication data written here is the communication data in the buffer area 131, 132 in which the communication data has been written up to the storage limit.

That is, the microcontroller 11 writes, to the target block, the communication data stored in the buffer area that is one of the buffer areas 131, 132 filled with the communication data. The microcontroller 11 does not write the communication data in the buffer areas 131, 132 at the same time to the non-volatile memory 14, but writes the communication data in the buffer areas 131, 132 to the non-volatile memory 14 in turn.

An example will be described with reference to the timing t2 and the timing t3 of FIG. 9. At the timing t2, the microcontroller 11 writes the communication data in the first buffer area 131 to the first sector st1 that is the target sector and in which the communication data has not been written. At the same time, newly received communication data is written to the second buffer area 132. In contrast, at the timing t3, the microcontroller 11 writes the communication data in the second buffer area 132 to the second sector st2 that is the target sector and has been erased.

When the event occurs, the data recording ECU 10 stores the communication data for the predetermined time period before and after the occurrence of the event not to erase it. However, the volatile memory 13 of the data recording ECU 10 does not have enough size to store all the communication data for the predetermined time period before and after the occurrence of the event. Since the data recording ECU 10 uses the volatile memory 13 for other controls, sufficient size is not secured. Accordingly, the data recording ECU 10 periodically stores the communication data in the buffer areas 131, 132 to the non-volatile memory 14.

In this case, the data recording ECU 10 writes to the non-volatile memory 14 in units of the size of each buffer area 131, 132. Accordingly, it may be preferable that the non-volatile memory 14 is divided into sectors each of which has the size corresponding to the buffer area 131, 132.

The data recording ECU 10 writes to the target block the communication data in the buffer area filled with the communication data. Accordingly, the data recording ECU 10 is configured to write the communication data to the target block from the buffer area filled with the communication data even when the communication data is being written to another buffer area. According to the data recording ECU 10 of the present disclosure, the time for writing the communication data to the non-volatile memory 14 from the buffer areas 131, 132 can be shortened as compared with the case where the number of the buffer area is one.

In step S26, the number of writes is counted (counting unit). The microcontroller 11 counts the number of writes to the current target block. The number of writes here means the number of times the communication data has been written to a specific sector or block. For example, when the current target block is the first block b1, the microcontroller 11 increments the counter value of the number of writes of the first block b1.

In step S27, it is determined whether the number of writes is equal to the upper limit minus X (counter determination unit). The microcontroller 11 determines whether the number of writes counted in step S26 has reached the upper limit minus X. The number of the upper limit minus X corresponds to the predetermined number of times. X may be one, for example.

Steps S26, S27 are performed for excluding the block from the target block before the number of writes of the block reaches the writing upper limit. That is, the microcontroller 11 sets the target block as the block for recording (saving) before the number of writes reaches the writing upper limit of the target block. The block for recording may be referred to as a non-target block or a limit-block.

In other words, the microcontroller 11 sets the target block of the non-volatile memory 14 as a saving area for saving the communication data without erasing it when the event occurs. Accordingly, X may be at least one. However, the upper limit of the non-volatile memory 14 may vary depending on individual differences and the like. When the X is greater than one, the communication data may be surely stored in the non-volatile memory 14. The communication data to be stored is the communication data for the predetermined time period before and after the occurrence of the event.

In step S28, the next writing target sector is set to be the next sector of the same block. After the microcontroller 11 writes the communication data stored in the buffer area 131, 132 to the target sector, the microcontroller 11 sets the next sector of the same block as the next sector to which the next communication data is written. For example, at the timing t2 shown in FIG. 9, the next writing target sector is set to be the second sector st2 of the first block b1. At the timing t3, the microcontroller 11 sets the third sector st3 of the first block b1 as the next writing target sector. The microcontroller 11 switches the target sector in order from the first sector st1 to the eleventh sector st11 of the target block.

As described above, the microcontroller 11 manages the target sector. When the event has not occurred, the microcontroller 11 continues to write the communication data to the same block until the number of writes of the block comes close to the writing upper limit.

In step S29, the next writing target sector is set to be the front sector of the next block (switching unit). The microcontroller 11 switches the target block to another block from the block which is determined to reach the predetermined number of writes. The microcontroller 11 excludes the target block which is determined to reach the predetermined number of writes from the writing target block of step S25, and uses the block as the limit-block. At timing t4 shown in FIG. 10, the first block b1 reached the predetermined number of writes. In this case, the microcontroller 11 sets the first sector st1 which is the front sector of the first block b2 as the next writing target sector. The first block b1 is set as the limit-block.

The limit-block is the block to which the communication data has been written up to the predetermined number of times. However, since the limit-block is excluded when the number of writes reaches the upper limit minus X as described above, the communication data can be written to the limit-block at least one time.

In step S31, the event writing process is performed. The event writing process will be described with reference to FIGS. 8, 11-14. When the determination in step S20 is "YES", the data recording ECU 10 starts the process shown in the flowchart of FIG. 8.

Figure 11:
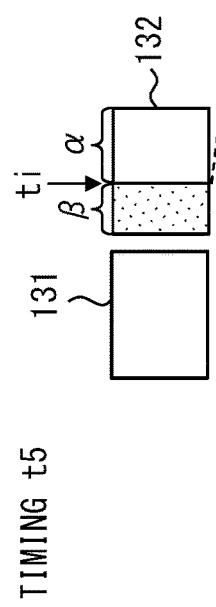
FIG. 11 is a diagram illustrating a writing process when an event occurs according to the embodiment.

In FIG. 11, the second block b2 is the target block, and the first block b1 is the limit-block. In FIG. 11, the communication data has been sequentially written in the first sector st1 to the fourth sector st4 of the second block b2 in this write cycle. In FIG. 11, a condition is shown where the event occurred when the next target sector is the fifth sector st5 of the second block b2.

The communication data has already been written in the fifth sector st5 to the eleventh sector st11 of the second block b2 in the previous write cycle. "ti" means the event timing at which the event occurred. The write cycle is a cycle in which the communication data is sequentially written from the buffer area 131, 132 to the non-volatile memory 14 in a condition where the event has not occurred. The write cycle may be called a normal write cycle.

In step S40, the next writing target sector is set to be the front sector of the current target block, and the next writing target block is changed to the limit-block (recording unit).

Current target block is the second block b2. The next writing target sector is the fifth sector st5 of the second block b2. Accordingly, the microcontroller 11 sets the fifth sector st5 of the second block b2 as the front sector. As a result, the microcontroller 11 writes the communication data from the buffer area 131, 132 to the fifth sector st5 of the second block b2 in the next write cycle.

Current limit-block is the first block b1. Accordingly, the microcontroller 11 changes the next writing target block to the first block b1. That is, when the second buffer area 132 is filled with the communication data, the microcontroller 11 writes the communication data in the second buffer area 132 to the fifth sector st5 of the first block b1.

In step S41, it is determined whether the storage of the data for the predetermined time period is completed. The predetermined time period here corresponds to the post-event period. The storage here is storing the communication data to the limit-block. As described above, each of the pre-event period and the post-event period is 5×h seconds. Since the communication speed is constant, the time length corresponding to the communication data written to the non-volatile memory at one time is also constant. Accordingly, the completion of the storage of the data for the predetermined time period can be determined from the number of writes to the buffer.

The microcontroller 11 determines whether the communication data has been written based on the number of writes to the buffer after the occurrence of the event. When the communication data has been written the predetermined number of times after the event has occurred, the microcontroller 11 determines that the storage of the communication data for the predetermined time period is completed, and the process proceeds to step S48. When the communication data has not been written up to the tenth sector st10 of the first block b1, the microcontroller 11 does not determine that the storage of the communication data for the predetermined time period is completed, and the process proceeds to step S42.

In FIG. 11, a represents an area to which the communication data after the occurrence of the event is stored. In contrast, β represents an area to which the communication data before the occurrence of the event has been stored.

Figure 7:
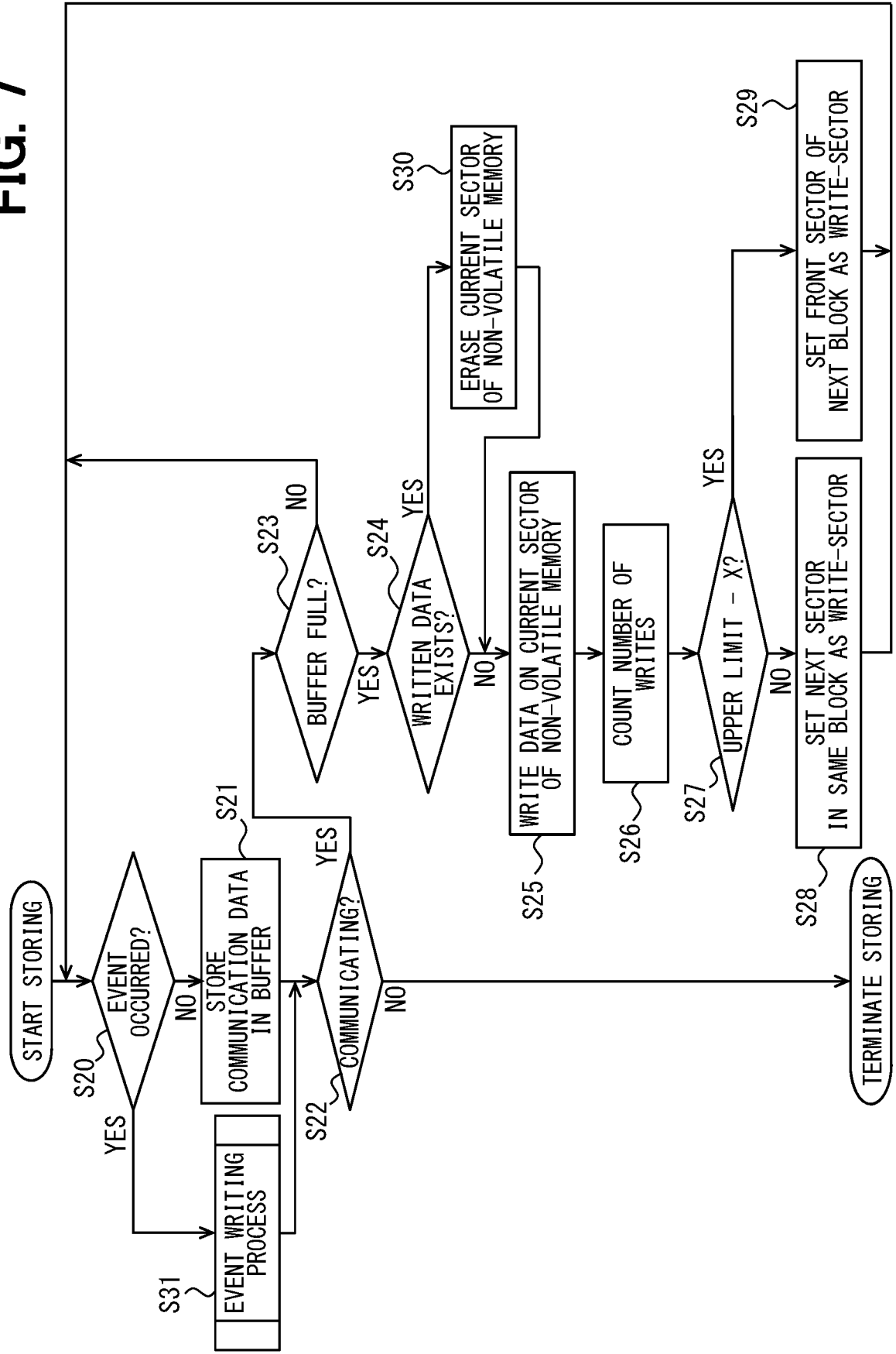
FIG. 7 is a flowchart illustrating a recording process of the data recording ECU of the embodiment.
Figure 8:
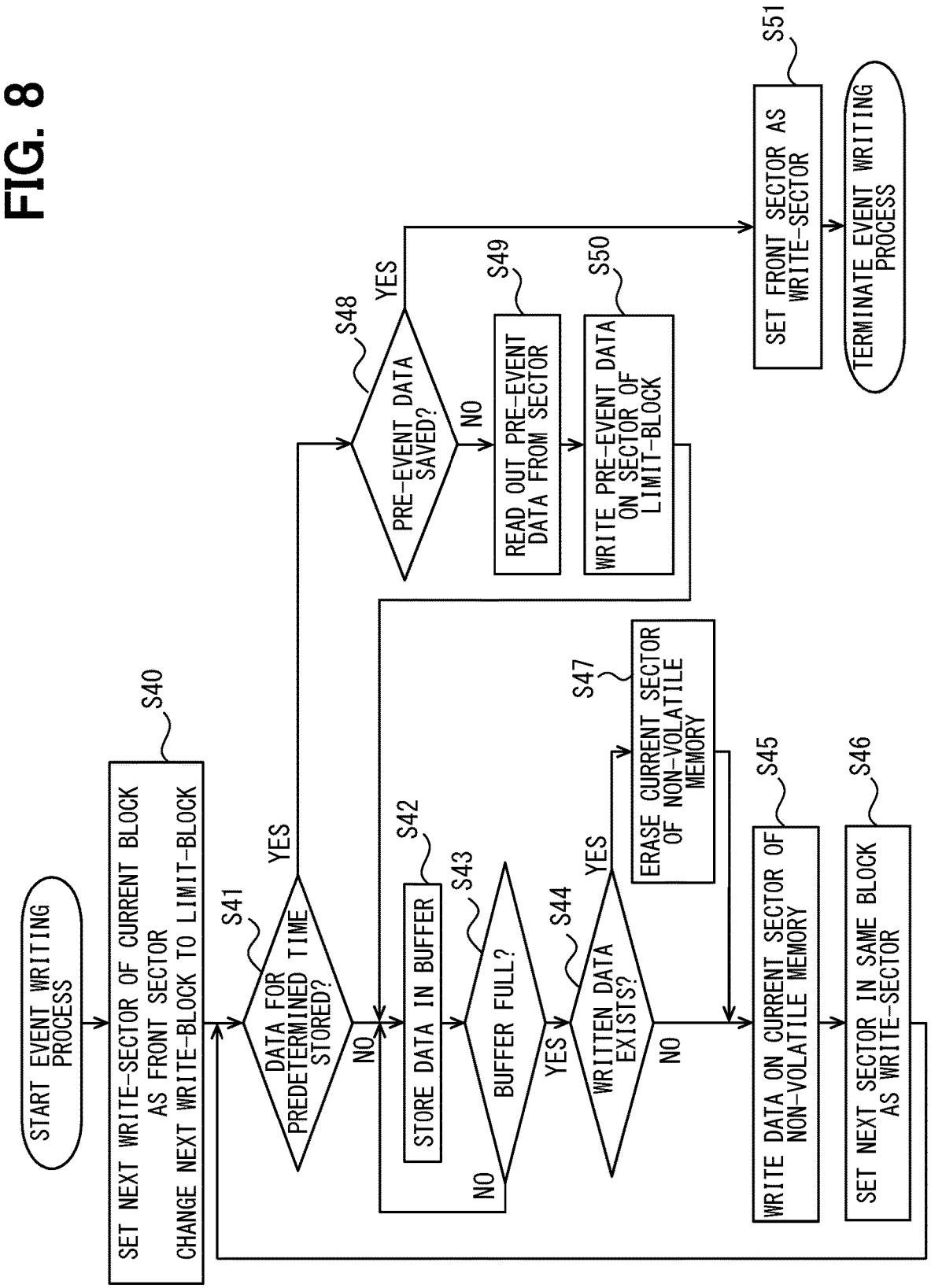
FIG. 8 is a flowchart illustrating a process in response to an event of the data recording ECU of the embodiment.

Steps S42-S46 are the same as the corresponding steps of FIG. 7 excepting the target block. That is, step S42 is the same as step S21. Step S43 is the same as step S23. Step S44 is the same as step S24. Step S45 (recording unit) is the same as step S25. Step S46 is the same as step S28. Step S47 is the same as step S30.

Figure 12:
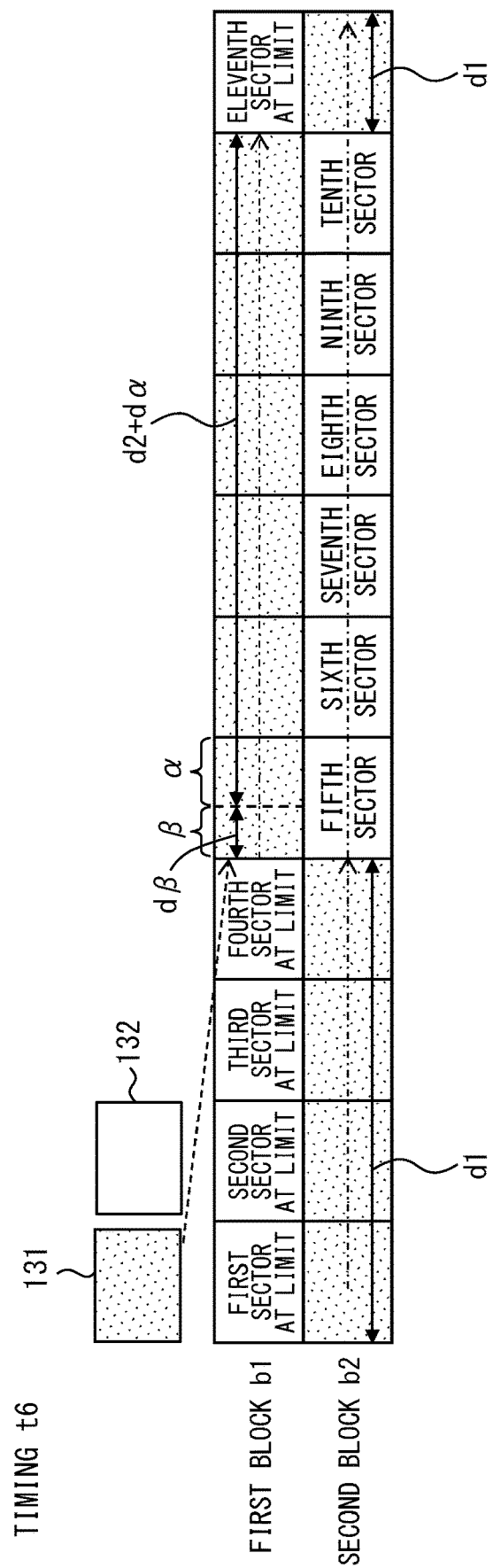
FIG. 12 is a diagram illustrating a recording process for a post-event data according to the embodiment.

According to these processes, when the microcontroller 11 determines that the event occurred, the microcontroller 11 records the recording data that is the communication data for the predetermined time period after the occurrence of the event by writing the recording data to the non-target block (limit-block). When the microcontroller 11 determines that the event occurred, the microcontroller 11 writes the communication data for the post-event period to the limit-block as the recording data (recording unit). That is, as shown in FIG. 12, the microcontroller 11 writes the communication data to the fifth to tenth sectors of the first block b1 as the recording data. As described above, in the post-event period, the microcontroller 11 writes the recording data from the buffer area 131, 132 to the limit-block.

The microcontroller 11 saves the post-event data d2 in the limit-block in this manner. The microcontroller 11 sets the fifth sector st5 of the second block b2 as the front sector in step S40. Accordingly, when the save of the data to the limit-block is completed, the microcontroller 11 performs step S21 and subsequent steps of the normal writing process using the fifth sector st5 of the second block b2 as the front sector.

In the present embodiment, the event occurs at the time when the communication data to be written to the fifth sector of the second block b2 is partially stored in the second buffer area 132. Accordingly, the communication data dβ before the event occurs and the communication data da after the event occurs are stored in the fifth sector st5 of the first block b1. Therefore, the communication data da is stored in the first block b1 in addition to the post-event data d2. That is, the communication data for longer time than the post-event period is stored in the first block b1 as the recording data. It may be useful that the data recording ECU 10 stores the communication data as the recording data for longer time than the time period for which the communication data recording is required.

The communication data dβ is the latest communication data before the event occurs. In the second block b2, the communication data stored in the eleventh sector st11 is the oldest communication data before the event occurs. In the second block b2, the communication data before the event occurs is stored in the first sector st1, the second sector st2, the third sector st3, and the fourth sector st4, in order.

The communication data stored in the eleventh sector st11, the first sector st1, the second sector st2, the third sector st3, and the fourth sector st4 of the second block b2 is the communication data to be saved (evacuated) in the first block b1 as the pre-event data d1. Accordingly, the pre-event data may be referred to as saving data. The data stored in these sectors may be a part of the pre-event data d1.

In step S48, it is determined whether saving of the pre-event data has been completed. The microcontroller 11 determines whether the pre-event data d1 stored in the second block b2 has been saved in the first block b1. When the microcontroller 11 determines that the saving has been completed, the process proceeds to step S51. When the microcontroller 11 does not determine that the saving has been completed, the process proceeds to step S49.

In step S49, the sector of the pre-event data is read (recording unit). That is, the microcontroller 11 reads out the communication data in the sectors of the second block b2 in which the pre-event data d1 is stored. In step S50, the pre-event data d1 is written to the sectors of the limit-block (recording unit). The microcontroller 11 reads out the pre-event data d1 from the second block b2 and saves it in the limit-block by writing the pre-event data d1 to the limit-block.

When it is determined that the event occurred, the microcontroller 11 writes to the limit-block the recording data that is the communication data for the predetermined time period before the event occurred. At this time, when it is determined that the event occurred, the microcontroller 11 reads out the recording data for the pre-event period from the target block and writes it to the limit-block. The recording data that is the communication data for the predetermined period before the event occurred corresponds to the pre-event data d1.

For example, the microcontroller 11 saves to the limit-block the eleventh sector st11, the first sector st1, the second sector st2, the third sector st3, and the fourth sector st4 of the second block b2 in order one sector at a time. At this time, the microcontroller 11 uses the buffer area 131, 132 of the volatile memory 13.

The microcontroller 11 reads out the saving data in the target sector to one buffer area 131, 132 while the microcontroller 11 stores (buffers) the acquired communication data to the other buffer area 131, 132. At the timing t7 shown in FIG. 13, the microcontroller 11 reads out the saving data to the first buffer area 131 while buffering the communication data in the second buffer area 132.

Figure 13:
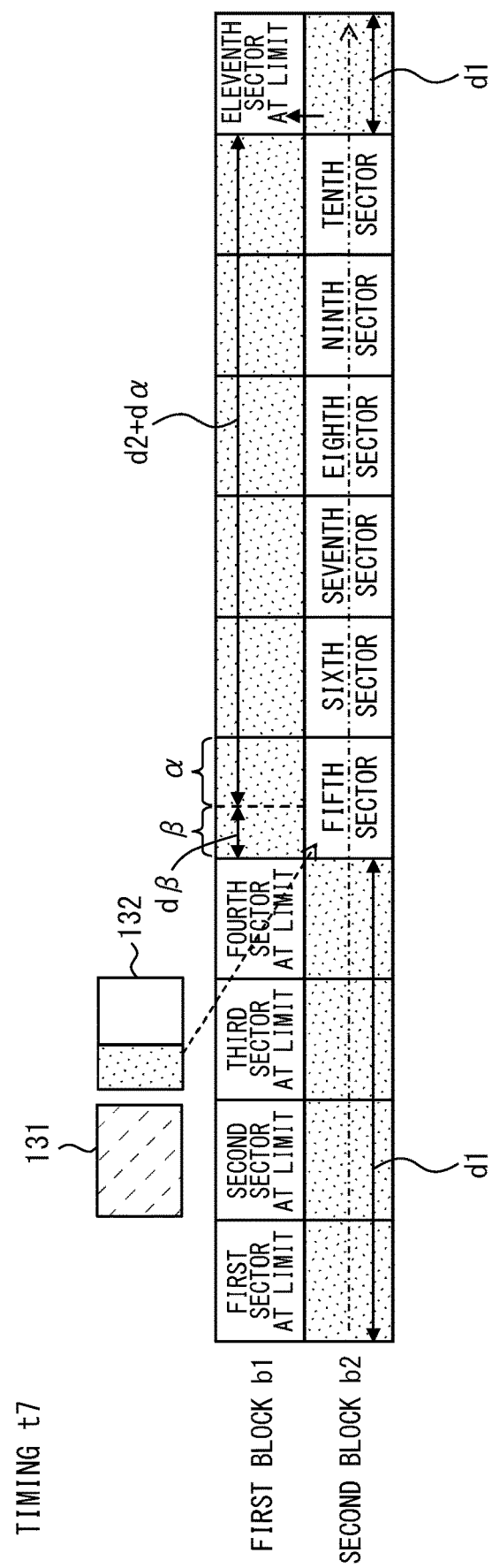
FIG. 13 is a diagram illustrating a data writing process after an event occurred according to the embodiment.

In the example shown in FIG. 13, the communication data buffered in the second buffer area 132 is the communication data to be stored to the fifth sector st5 of the second block b2. The saving data read out to the first buffer area 131 is the communication data that has been written in the eleventh sector st11 of the second block b2.

The microcontroller 11 writes, to the eleventh sector st11 of the first block b1, the saving data read out to the first buffer area 131. Thus, the communication data that has been written in the eleventh sector st11 of the second block b2 is saved in the first block b1. The microcontroller 11 performs the similar processes to the remaining sectors in which the pre-event data d1 has been stored.

As a result, the pre-event data d1 is saved in the limit-block as shown in FIG. 14. As described above, the microcontroller 11 is configured to save, in the limit-block, the pre-event data d1 that has been stored in the block having a margin of the number of writes compared to the limit-block.

As described above, the communication data dβ before the event occurs is stored in the fifth sector st5 of the first block b1. Therefore, the communication data dβ is stored in the first block b1 in addition to the pre-event data d1. That is, the communication data for longer time than the pre-event period is stored in the first block b1 as the recording data.

In step S51, the front sector is set as the next writing target sector. The microcontroller 11 sets the front sector as the next writing target sector and restarts the normal writing process.

As described above, the data recording ECU 10 is configured to set the target block that reached the predetermined number of writes as the non-target block, and stop writing the data to the non-target block. Accordingly, the data recording ECU 10 is configured to limit the number of writes of the non-target block from reaching the writing upper limit. Then, the data recording ECU 10 records the recording data to the non-target block in response to the event. Accordingly, the non-target block can be used up to nearly the writing upper limit. Therefore, the data recording ECU 10 can record the communication data while suppressing the shortening of the life of the non-volatile memory 14.

The units or functions provided by the data recording ECU 10 may be provided by software stored in a tangible memory device and a computer executing the software, only software, only hardware, or a combination of the software and the hardware. For example, when the data recording ECU 10 is provided by an electronic circuit implemented as hardware, the electronic circuit may be provided by a digital circuit including multiple logic circuits or analog circuits.

The preferred embodiment of the present disclosure has been described above. However, the present disclosure is not limited in any way to the above-mentioned embodiment, and various modifications can be performed without departing from the spirit of the present disclosure.

Additional advantages and modifications will readily occur to those skilled in the art. The disclosure in its broader terms is therefore not limited to the specific details, representative apparatus, and illustrative examples shown and described.

What is claimed is:

1. A vehicle data recording device comprising:
a non-volatile memory configured to store data indicative of a vehicle state, a storage area of the non-volatile memory being divided into blocks each of which has a size corresponding to the data for a predetermined time period before and after an event occurs;
a counting unit configured to count a number of writes to each of the blocks;
a writing unit configured to write the data to a target block that is a writing target in the blocks;
a counter determination unit configured to determine whether the number of writes to the target block reached a predetermined number that is smaller than a writing upper limit;
a switching unit,
wherein
when the counter determination unit determines that the number of writes to the target block reached the predetermined number, the switching unit excludes the target block from the writing target of the writing unit, sets the target block as a non-target block, and switches the target block to another one of the blocks,
the vehicle data recording device further comprises:
an event determination unit configured to determine whether the event occurred; and
a recording unit configured to record recording data that is the data for the predetermined time period before and after the event occurred by writing the recording data to the non-target block when the event determination unit determines that the event occurred, and
when the event determination unit determines that the event occurred, the recording unit reads out, from the target block, the recording data for a pre-event period that is the predetermined time period before the event occurred, and the recording unit writes the recording data to the non-target block.

2. The vehicle data recording device according to claim 1, further comprising:
a volatile memory configured to temporarily store the data, wherein
the writing unit is configured to write the data stored in the volatile memory to the target block.

3. The vehicle data recording device according to claim 2, wherein
the volatile memory includes a buffer configured to temporarily store the data,
the block is divided into sectors each of which has a size corresponding to the buffer, and
the writing unit is configured to write the data stored in the buffer to the sector of the target block.

4. The vehicle data recording device according to claim 3, wherein
the volatile memory includes a plurality of the buffers, the plurality of buffers being configured to store the data in turn, the writing unit is configured to write, to the target block, the data stored in one buffer of the plurality of buffers which was filled with the data.

5. The vehicle data recording device according to claim 3, wherein
when the writing unit writes the data stored in the buffer to the sector of the target block, the writing unit writes next one of the data to another sector of the same target block.

6. The vehicle data recording device according to claim 3, wherein
when the event determination unit determines that the event occurred, the recording unit writes, to the non-target block, the recording data for a post-event period that is the predetermined time period after the event occurred, and
the writing unit is configured to write the data stored in the buffer to the target block after the post-event period elapsed.

7. A vehicle data recording device comprising:
a non-volatile memory configured to store data indicative of a vehicle state, a storage area of the non-volatile memory being divided into blocks each of which has a size corresponding to the data for a predetermined time period before and after an event occurs; and
a processor configured to:
count a number of writes to each of the blocks;
write the data to a target block that is a writing target in the blocks;
determine whether the number of writes to the target block reached a predetermined number that is smaller than a writing upper limit;
exclude the target block from the writing target, set the target block as a non-target block, and switch the target block to another one of the blocks when the counter determination unit determines that the number of writes to the target block reached the predetermined number;
determine whether the event occurred; and
record recording data that is the data for the predetermined time period before and after the event occurred by writing the recording data to the non-target block when the event determination unit determines that the event occurred,
wherein
when the processor determines that the event occurred, the processor reads out, from the target block, the recording data for a pre-event period that is the predetermined time period before the event occurred, and the processor writes the recording data to the non-target block.

* * * * *